US008485318B2

(12) United States Patent
Doran

(10) Patent No.: US 8,485,318 B2
(45) Date of Patent: Jul. 16, 2013

(54) ELEVATOR ROPE BRAKING SYSTEM

(76) Inventor: Paul J. Doran, Yardley, PA (US)

( * ) Notice: Subject to any disclaimer, the term of this patent is extended or adjusted under 35 U.S.C. 154(b) by 521 days.

(21) Appl. No.: 12/767,150

(22) Filed: Apr. 26, 2010

(65) Prior Publication Data

US 2010/0288587 A1 Nov. 18, 2010

Related U.S. Application Data

(60) Provisional application No. 61/178,765, filed on May 15, 2009.

(51) Int. Cl.
*B66B 5/00* (2006.01)
*B65H 59/16* (2006.01)
*B60T 13/04* (2006.01)

(52) U.S. Cl.
USPC ........................... 187/350; 188/65.1; 188/171

(58) Field of Classification Search
USPC .................................. 187/350; 188/65.1, 171
IPC .......................................................... B66B 5/00
See application file for complete search history.

(56) References Cited

U.S. PATENT DOCUMENTS

| | | | | |
|---|---|---|---|---|
| 1,738,214 | A * | 12/1929 | Thurston | 187/254 |
| 2,886,149 | A * | 5/1959 | Baermann | 192/18 B |
| 4,030,007 | A * | 6/1977 | Price et al. | 318/744 |
| 4,567,419 | A | 1/1986 | Watanabe | |
| 5,101,937 | A * | 4/1992 | Burrell et al. | 187/350 |
| 5,131,510 | A * | 7/1992 | Jamrus et al. | 188/171 |
| 5,228,540 | A * | 7/1993 | Glaser | 187/355 |
| 6,142,266 | A * | 11/2000 | Appeldorn et al. | 188/171 |
| 6,193,026 | B1 | 2/2001 | Sevilleja et al. | |
| 6,230,844 | B1 | 5/2001 | Latorre | |
| 6,260,673 | B1 | 7/2001 | Mustalahti | |
| 6,315,080 | B1 | 11/2001 | Doran | |
| 6,520,299 | B2 | 2/2003 | Rimann et al. | |
| 6,578,674 | B2 | 6/2003 | Doran | |
| 6,659,237 | B1 | 12/2003 | Pribonic | |
| 6,681,898 | B1 | 1/2004 | Doran | |
| 7,080,717 | B2 * | 7/2006 | Ito | 187/350 |
| 7,104,367 | B2 * | 9/2006 | Ferrand et al. | 188/170 |
| 7,243,759 | B2 | 7/2007 | Doran | |
| 7,341,129 | B2 * | 3/2008 | Hsieh | 188/171 |
| 7,407,040 | B2 | 8/2008 | Doran | |
| 7,500,543 | B2 | 3/2009 | Doran | |
| 7,699,145 | B2 | 4/2010 | Ericson | |
| 7,909,145 | B2 | 3/2011 | Erny et al. | |
| 2006/0090969 | A1 * | 5/2006 | Eckenstein et al. | 188/65.1 |

* cited by examiner

*Primary Examiner* — William E Dondero
*Assistant Examiner* — Minh Truong
(74) *Attorney, Agent, or Firm* — Howard IP Law Group, PC

(57) ABSTRACT

An elevator rope braking system including a base portion and a top portion affixed by at least one mounting structure; an outer housing and a magnetic core arranged on and affixed to the base portion; an armature plate intermediate the top portion and the base portion having an armature extending toward the base portion; and an electromagnetic coil positioned between the outer housing and the magnetic core and operative to provide an electromagnetic force sufficient to move the armature from a first braking position to a second non-braking position.

19 Claims, 9 Drawing Sheets

ELEVATOR ROPE BRAKING SYSTEM

CROSS-REFERENCE TO RELATED APPLICATIONS

This application claims priority under 35 U.S.C.§119(e) to Provisional Patent Application Ser. No. 61/178,765 entitled "Elevator Rope Braking System" filed May 15, 2009, the subject matter thereof incorporated by reference in its entirety.

FIELD OF THE INVENTION

The present invention relates to elevator rope braking systems.

BACKGROUND

Elevator rope braking systems are an important safety feature in elevator operation. These systems are configured to brake elevator hoist ropes when unintended movement in the elevator car is sensed (e.g., movement of the car when the doors are open). These systems reduce the risk of unintended entry (e.g., falling into an open elevator shaft), as well as reduce the risk of personal injury from forces generated by the elevator car moving within the shaft. Elevator rope braking systems are additionally configured to stop overspeeding cars. This may occur, for example, when a substantially empty elevator car moves too quickly in the upward direction due to the great force of the counterweight.

Present systems operate to automatically arrest the elevator rope in the event that power to the rope braking system is lost. However, such systems often comprise complex arrangements with numerous moving parts that create only a limited amount of braking force. Minimizing moving parts can reduce the risk of mechanical failure as well as the cost of construction and maintenance. Alternative systems and methods are desired.

SUMMARY OF THE INVENTION

In one exemplary embodiment, an elevator rope braking system includes a base portion and a top portion attached by at least one mounting structure. An electromagnetic coil and magnetic core are positioned on the base portion. An armature is disposed between the base portion and the top portion and configured to move between a first braking position and a second non-braking position when the electromagnetic coil is powered.

In another exemplary embodiment, an elevator rope braking system includes an enclosure having top and bottom fixed plates and containing a housing positioned on the bottom plate and containing an electromagnetic coil. The top and bottom plates are preferably arranged in parallel. An armature plate is in parallel with the top plate and has an armature on a first surface thereof proximal to the housing and in operative relation with the electromagnetic coil. A spring is disposed on the top surface of the housing between the armature plate for urging the armature plate in a direction toward the top plate to close a gap between the armature plate and the top plate thereby defining a braking position that restricts motion of one or more ropes disposed there through. The system further includes a circuit for powering the electromagnetic coil to generate a force sufficient to overcome the spring force and cause movement of the armature plate toward the housing, thereby increasing the gap between the armature plate and the top plate sufficient to permit one or more ropes disposed there through to pass freely, defining a non-braking position. The armature plate may include a brake pad on a second surface opposite the first surface and in alignment with a brake pad mounted on an interior surface of the top plate for engaging the ropes to restrict movement when power is not applied to the circuit.

DETAILED DESCRIPTION

It is to be understood that the figures and descriptions of the present invention have been simplified to illustrate elements that are relevant for a clear understanding of the present invention, while eliminating, for the purpose of clarity, many other elements found in elevator rope braking systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
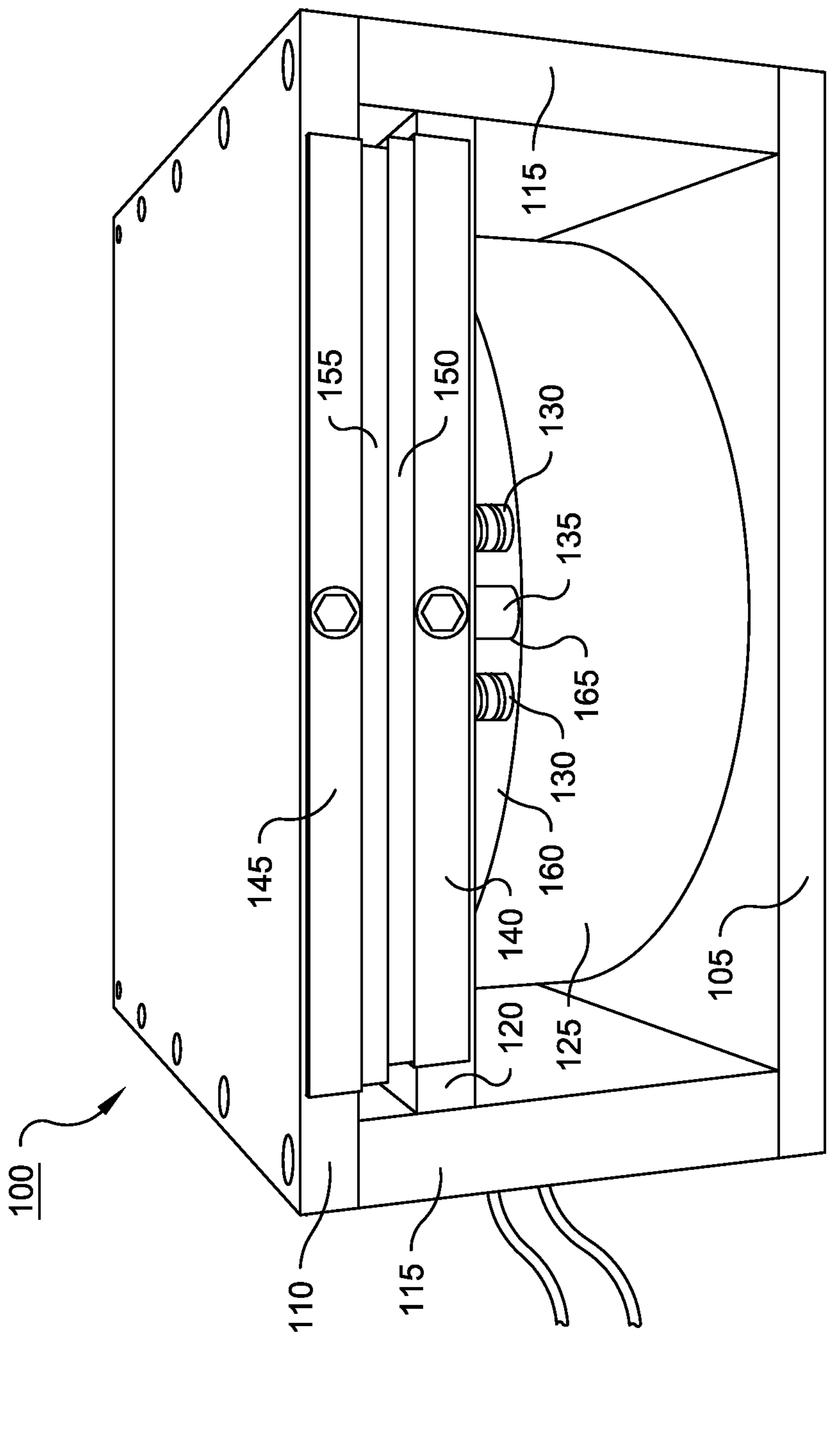
FIG. 1 is a perspective view of an elevator rope braking system according to an embodiment of the present invention.
Figure 2:
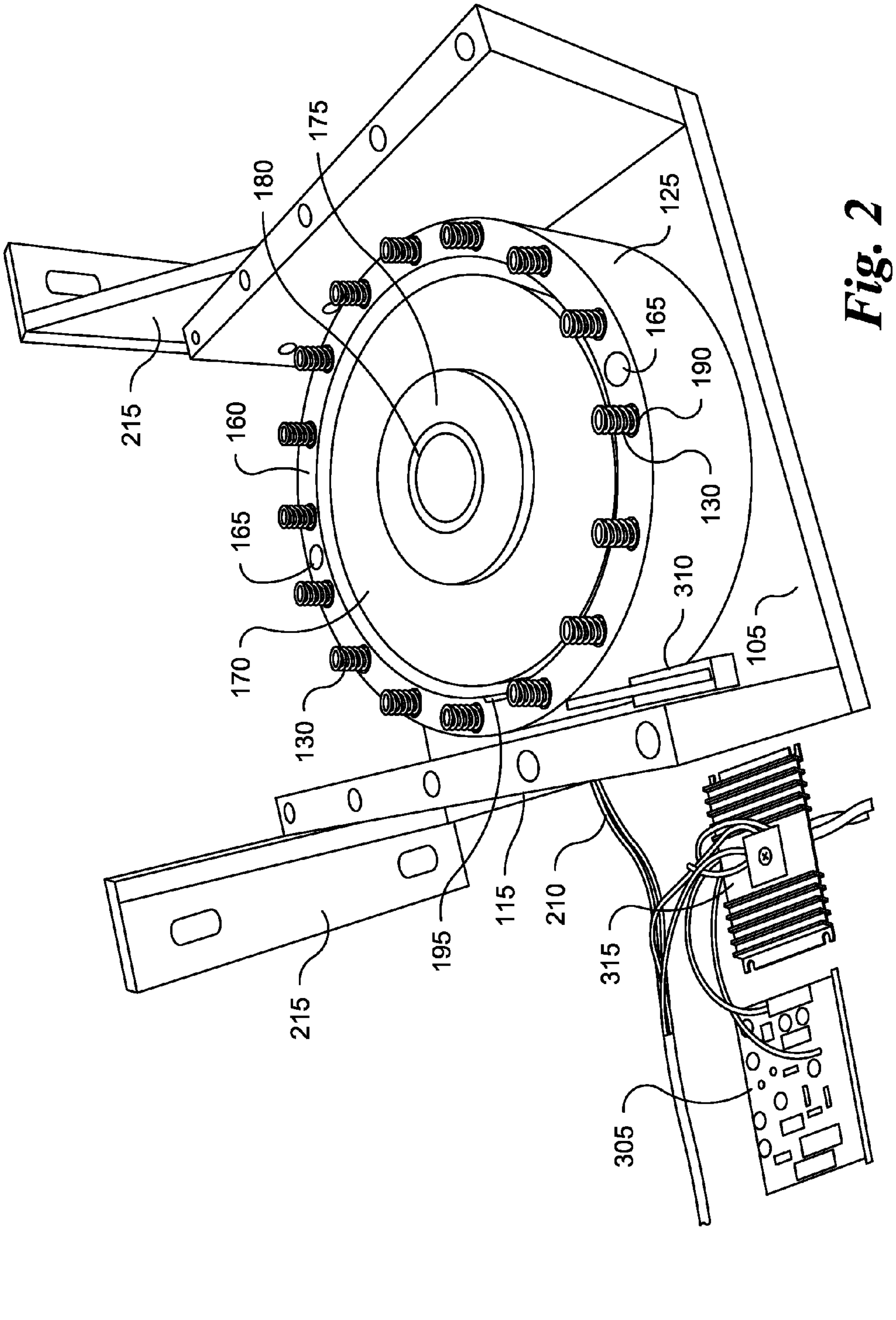
FIG. 2 is a partial view of an elevator rope braking system according to an embodiment of the present invention.

Referring generally to FIG. 1, an elevator rope braking system 100 is shown. Elevator rope braking system 100 includes a base plate 105 and a top plate 110 joined by mounting structures, for example, rigid mounting plates 115. Each mounting plate 115 may be affixed at its opposite ends to base plate 105 and to top plate 110 by conventional fastening means, for example, bolts. Base plate 105, top plate 110 and mounting plates 115 may be made of a rigid metal, such as steel. Mounting plates 115 may include one or more bores (not shown) to allow for electrical conductors (for example, electrical wires) to pass therethrough. Such electrical conductors may be used for communication and/or power distribution, for example to convey power to an electromagnetic coil 170 (FIG. 2).

An outer housing 125 is positioned between the base plate 105 and the top plate 110 and is mounted to a top surface of base plate 105. Outer housing 125 may be mounted to base plate 105 by conventional means, such as bolts. In a preferred embodiment, outer housing 125 comprises an annular ring having a central cavity of diameter sufficient to house electromagnetic coil 170 (FIG. 2). Outer housing 125 may be made of a metal, such as Dura-bar® cast iron bars, produced by Wells Manufacturing Company. A top surface 160 of outer housing 125 may have two or more guide bores 165 adapted to receive guide pins 135 of an armature plate 120. The top surface 160 may also have a plurality of spring mounting points 190 for mounting springs 130.

Figure 3:
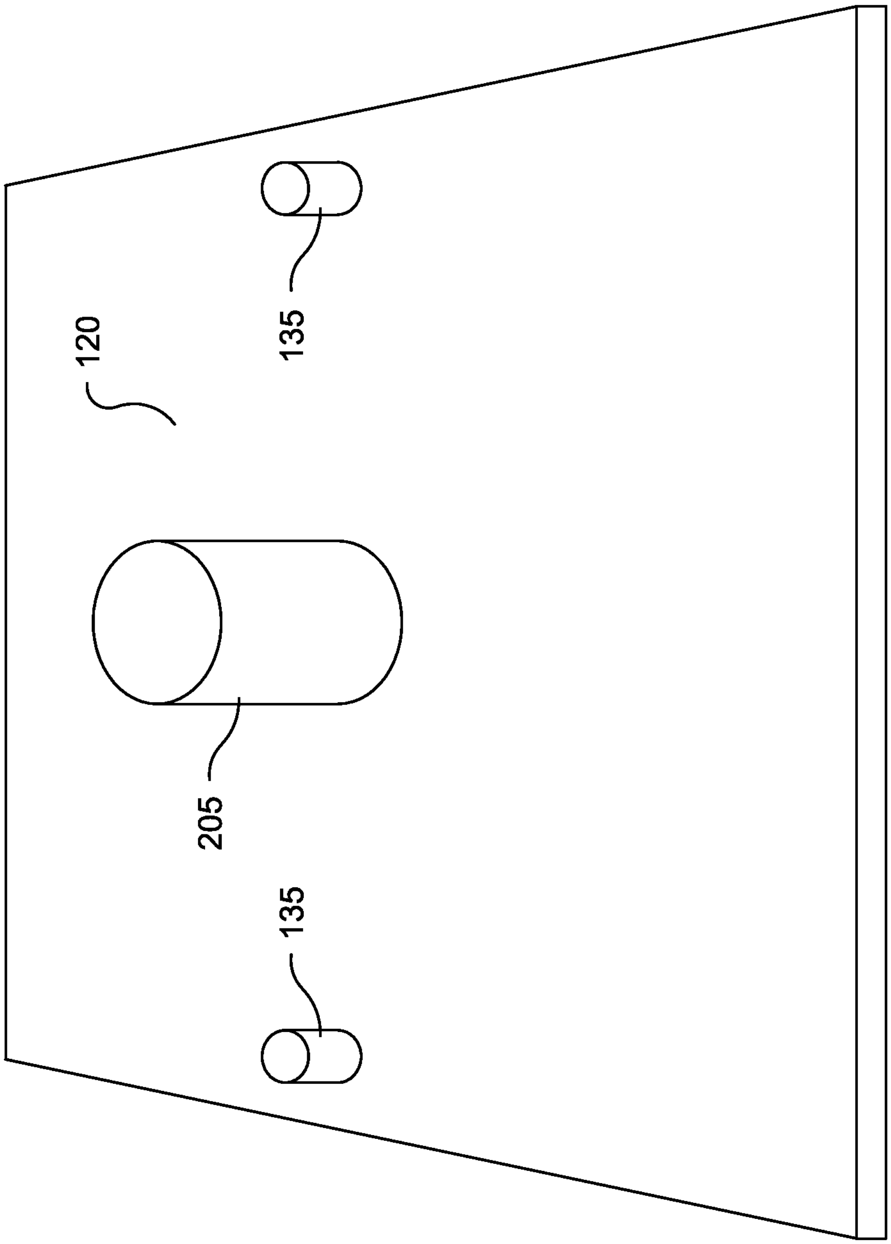
FIG. 3 is a bottom view of an armature plate for use in the elevator rope braking system according to an embodiment of the present invention.

An armature plate 120 is disposed between the top surface 160 of outer housing 125 and the top plate 110. Armature plate 120 is configured so that the guide pins 135 extend from a bottom surface thereof (as seen in FIG. 3) into the two or more guide bores 165 of outer housing 125. The springs 130 are disposed at the mounting points 190 of the outer housing 125 so as to lie between the armature plate 120 and the top surface of outer housing 160, biasing the armature plate 120 toward the top plate 110.

Brake pad 150 is disposed on the major surface of armature plate 120 that faces top plate 110 and brake pad 155 is disposed on the major surface of top plate 110 that faces armature plate 120 such that the brake pads 150,155 face one another. Brake pads 150,155 are configured so that as springs 130 urge armature plate 120 toward top plate 110, brake pads 150,155 clamp down on hoist ropes 400, thereby arresting their movement (See FIG. 5).

In a preferred embodiment, brake pad 150 is disposed on a first brake shoe 140 that may be attached to armature plate 120. Similarly, brake pad 155 is disposed on a second brake shoe 145 which is attached to top plate 110. Brake pads 150,155 may be made of a material such as Scan-Pac lining material RF38, by way of example only and may be attached to brake shoes 140,145 by conventional means such as adhesives, more particularly an epoxy adhesive manufactured under the trade name Loctite 608. Brake shoes 140,145 may be attached to armature plate 120 and top plate 110 respectively by conventional means such as one or more bolts. In this way, brake pads can be easily replaced if necessarily. Brake shoes 140,145 may be made of a rigid material, such as steel.

Referring generally to FIG. 2, a partial view of the rope braking system of FIG. 1 is shown with the armature plate 120 and top plate 110 removed. Magnetic core 175 is mounted on the top surface of base plate 105 and centrally positioned within outer housing 125. The area between outer housing 125 and magnetic core 175 defines an annular ring which receives the electromagnetic coil 170. Magnetic core 175 may have an outer diameter substantially similar to the inner diameter of electromagnetic coil 170. Magnetic core 175 may be made of magnetic material, such as iron, and may be attached to base plate 105 by conventional means, such as via bolts.

Magnetic core 175 may further include a central hollow portion in which a bushing 180 is disposed. Bushing 180 comprises an inner hollow portion adapted to receive armature 205 (shown in FIG. 3). The inner diameter of bushing 180 is preferably about 0.005" to about 0.007" greater than the outer diameter of armature 205, thus bushing 180 and armature 205 essentially form a bearing, allowing for movement of armature plate 120 perpendicular to the major surface of base plate 105. Bushing 180 may be press-fit into the central hollow portion of magnetic core 175 and may be made of brass.

Guide bores 165 may be disposed substantially uniformly around the top surface 160 of outer housing 125 to ensure alignment of armature plate 120 and outer housing 125. While FIG. 2 shows two bores 165, other numbers of bores may be utilized without departing from the scope of the present invention. Alternatively, the elevator rope braking system may not include guide bores but may rely on the arrangement of the mounting plates 115, magnetic core 175 and armature 205 to maintain alignment of armature plate 120.

Top surface 160 also includes a plurality of spring mounting points 190 for mounting springs 130. Spring mounting points 190 may be embodied as pins, bores, notches or cavities adapted to receive and retain a portion of springs 130. Spring mounting points 190 and springs 130 may be substantially uniformly distributed about the top surface 160 of outer housing 125. Even distribution of spring mounting points 190 and springs 130 allows for even braking force on elevator hoist ropes 400 (shown in FIG. 5), thereby increasing friction between brake pads 150,155 and elevator ropes 400, as well as promoting even wear of the brake pads 150,155. It should be noted that although FIG. 2 shows an embodiment of the present invention with 16 springs 130 disposed in 16 bores 190, it is understood that greater or fewer numbers of springs may be used. Springs 130 may comprise any conventional spring type, such as coil springs, and may be made of conventional spring materials, such as hardened steel. The number of springs 130 and their spring constant may be selected for a specific elevator rope braking system 100 in accordance to the desired braking force. Springs 130 may be selected so that at all operable times springs 130 are compressed to such an extent that they exhibit a consistent spring constant. Springs 130 may additionally be selected so that in operation they are never compressed or stretched beyond their elastic limits.

Figure 9:
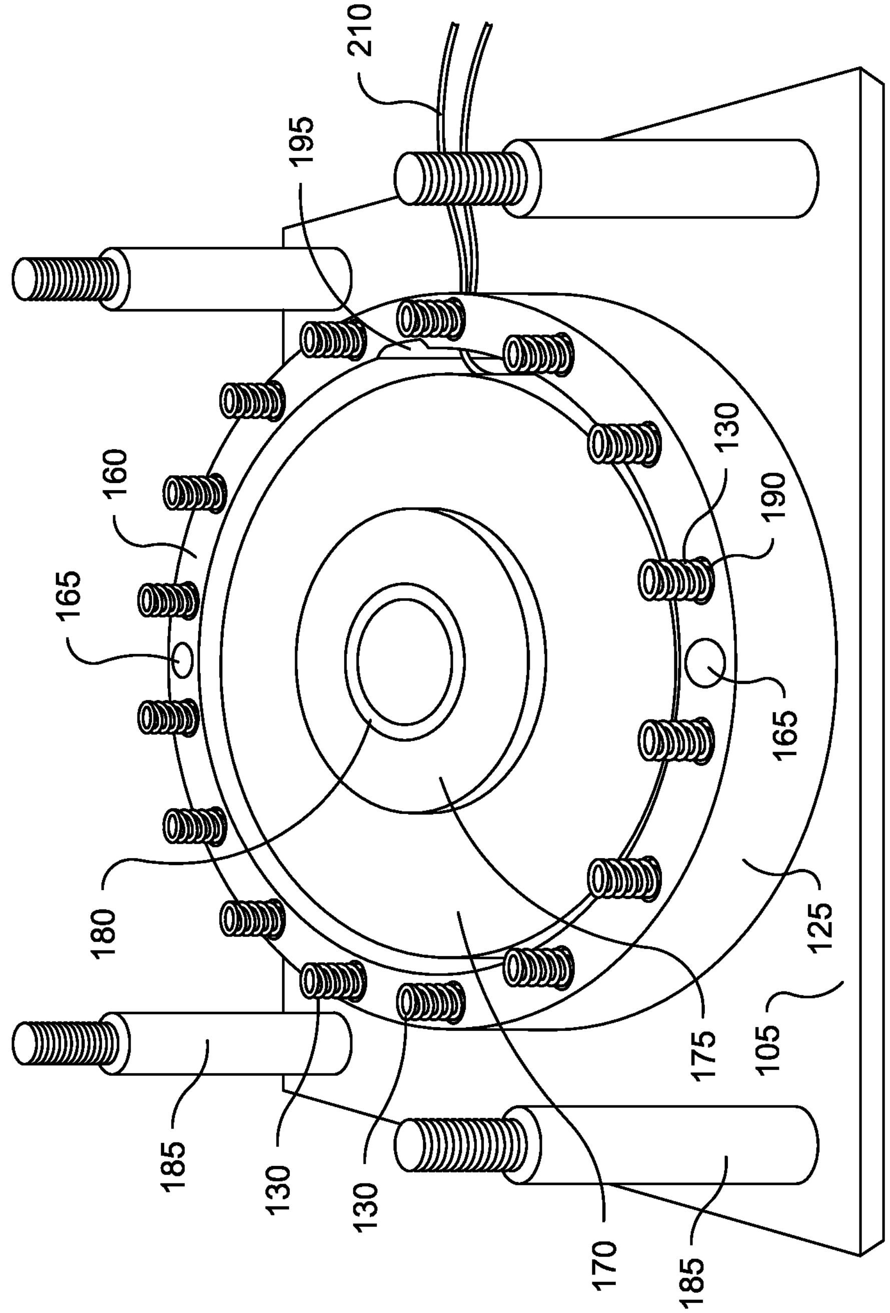
FIG. 9 is a partial view of an elevator rope braking system according to another embodiment of the present invention.

Outer housing 125 may have a bore (not shown) spanning from the inner surface through the housing to the outer surface to allow coil lead 210 to pass through outer housing 125. Outer housing 125 may also include a channel 195 to assist with feeding coil lead 210 through housing 125 during installation of electromagnetic coil 170 (seen also in FIG. 9).

In an exemplary configuration, electromagnetic coil 170 may rest on base plate 105 within outer housing 125 and attached to coil lead 210 extending through outer housing 125. Electromagnetic coil 170 may be configured as to size, wire gauge, and overall dimensions according to the application required and the required braking force for the elevator rope braking system 100. Electromagnetic coil 170 may, for example, be configured from 12 gauge copper round wire in an elevator rope braking system 100 adapted to create a braking force which may vary according to the particular application required. By way of non-limiting example only, such force may be in the range of about 1800 to about 5000 pounds per square inch ("$lb/in^2$") of braking force. The wire gauge may be adjusted for current flow. For example, 14 or 16 gauge wire may be used in an elevator rope braking system 100 adapted to create less braking force.

The outer diameter of electromagnetic coil 170 may be substantially similar to the inner diameter of outer housing 125 so as to fit snugly within the interior of outer housing 125. The area surrounding electromagnetic coil 170, defined by the inner edge of outer housing 125, the outer edge of magnetic core 175 and the base plate 105, may be filled with an epoxy. The epoxy would mitigate displacement of electromagnetic coil 170 during operation of the elevator rope braking system 100. The epoxy would additionally mitigate electromagnetic coil 170 "sweating" while in use.

As described in more detail with respect to FIGS. 6 and 7 below, the electromagnetic coil 170 is supplied power by a direct current drive 305 and a full wave rectifier bridge 315, both of which are coupled to coil leads 210.

In a preferred embodiment, elevator rope braking system 100 may have feet and adjusters 215 to allow for mounting of an elevator rope braking system 100 within an elevator shaft such that hoist ropes pass between first brake pad 150 and second brake pad 155. The feet and adjusters 215 additionally allow for post-installation adjustment.

Elevator rope braking system 100 may be configured to be operable on various sized elevator hoist ropes. For example, elevator rope braking system 100 may be configured so that the same braking system may be used for hoist ropes of various diameters, such as 0.75 inch, 0.625 inch, or 0.5 inch by way of non-limiting example. This flexibility may be achieved by selecting springs that may compress and decompress to a sufficient extent as to compensate for the variations in cable diameters. Additionally, mounting plates 115 may be shimmed or re-machined to allow for larger or smaller hoist rope diameters.

Elevator rope braking system 100 may be configured to operate independent of the thickness of brake pads 150,155. Accordingly, as brake pads 150,155 wear down (i.e. become thinner in places where brake pads 150,155 contact elevator ropes 400), springs 130 compress to a greater extent when elevator rope braking system 100 is in the braking position than when brake pads 150,155 were originally installed. Likewise, electromagnetic coil 170 is adapted to provide sufficient electromagnetic force to draw armature plate 120 from the braking position to the non-braking position even as brake pads 150,155 wear.

Each of the displayed embodiments includes a first brake pad 150 that moves relative to a stationary second brake pad 155. This may provide the advantage of minimizing deflection in the hoist ropes in addition to lowering cost and complexity. However, alternative embodiments may include a coil and armature system on each side of the hoist ropes, allowing for increased braking force.

FIG. 3 is a bottom view of an exemplary embodiment of an armature plate 120. Armature plate 120 comprises a substantially flat plate having an armature 205 and guide pins 135 mounted on a bottom side thereof. Armature 205 may be centered on armature plate 120 such that it aligns with bushing 180 of base plate 105, thus allowing armature 205 to extend within the inner hollow portion defined by bushing 180. Guide pins 135 may be disposed on armature plate 120 and configured to align with and be inserted into guide bores 165 of outer housing 125.

Figure 4:
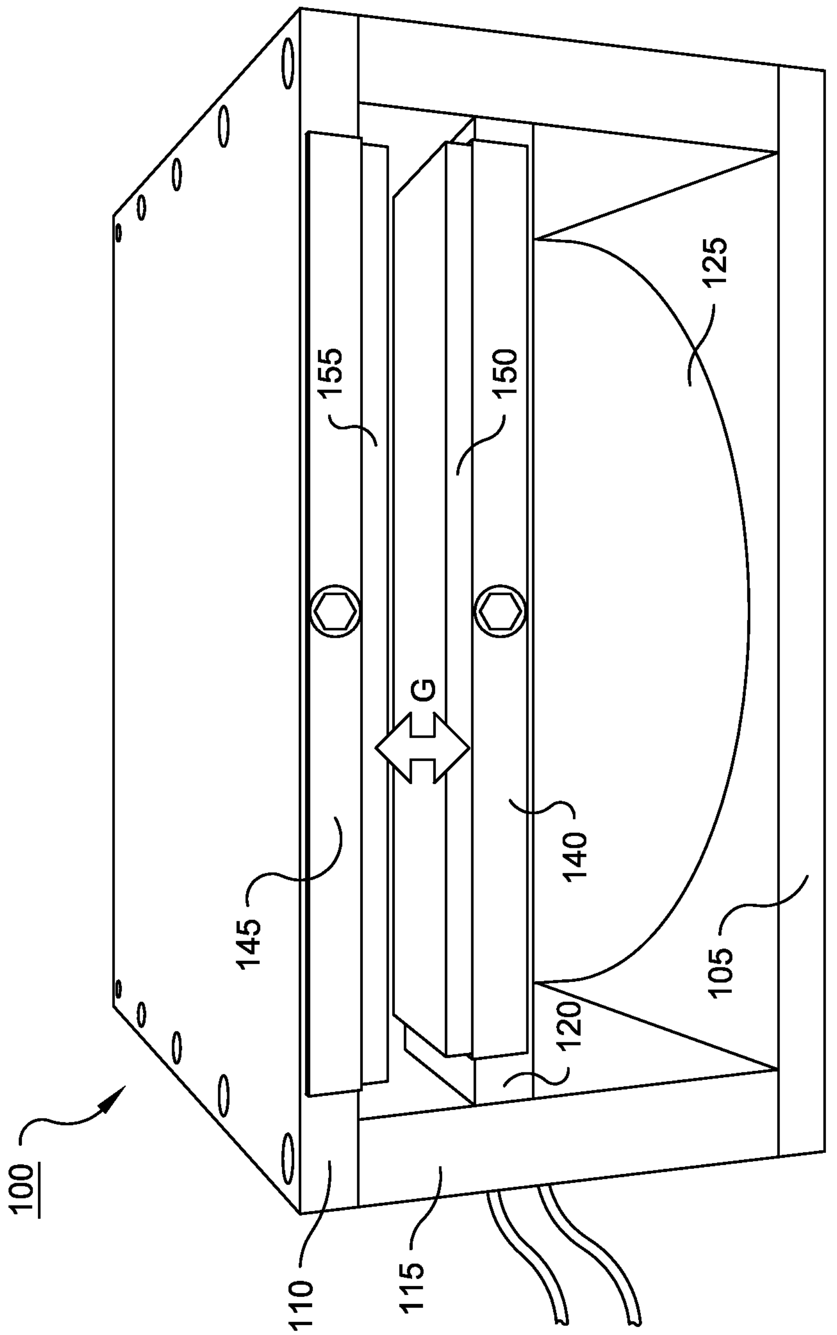
FIG. 4 is a view of an elevator rope braking system in a non-braking position according to an embodiment of the present invention.
Figure 5:
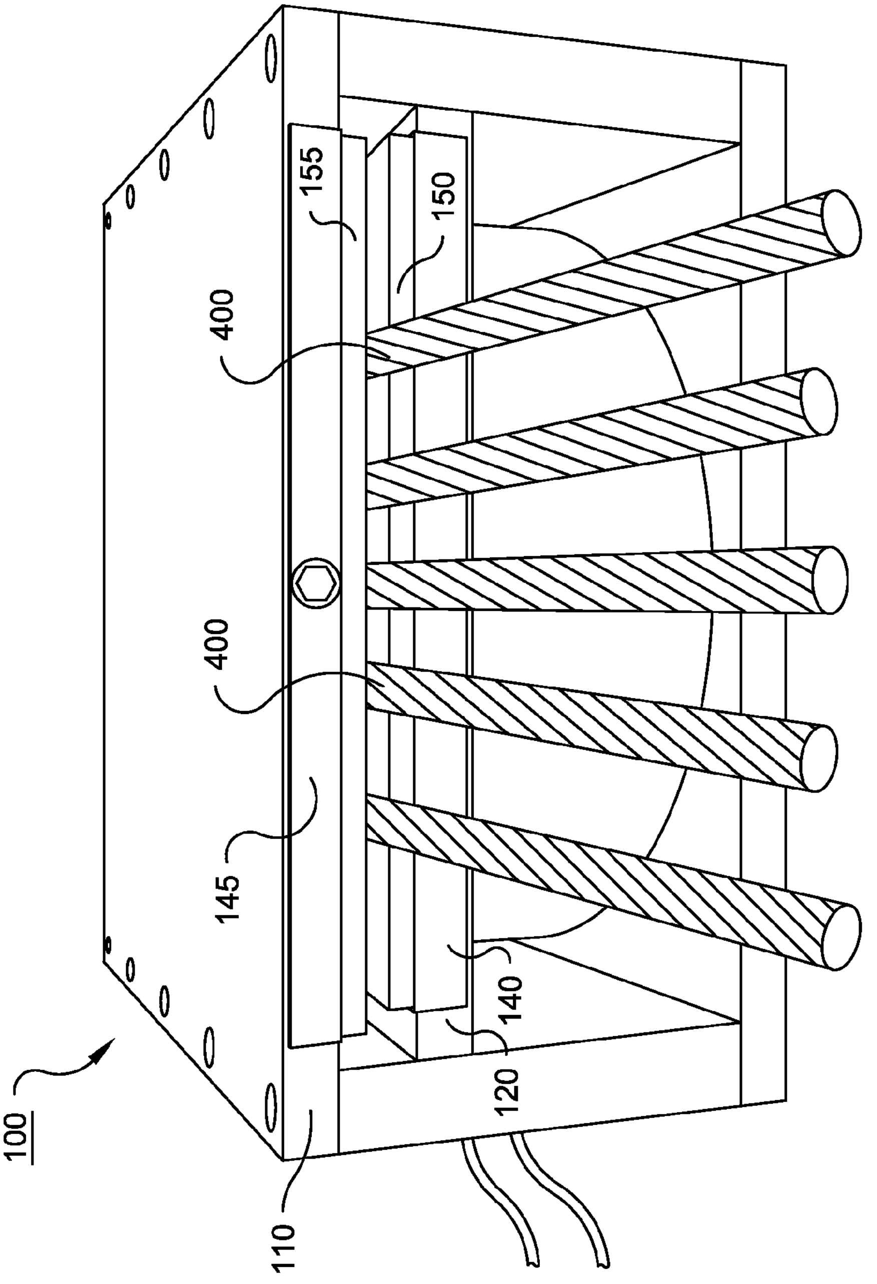
FIG. 5 is a view of an elevator rope braking system in a braking position according to an embodiment of the present invention.

Referring generally to FIG. 4, an exemplary elevator rope braking system 100 is shown in a non-braking or energized state. In a first energized state, electromagnetic coil 170 is provided power to create a magnetic field sufficient to overcome the force exerted by springs 130 and draw armature 205 into the hollow portion of magnetic core 175. At the beginning of the first energized state, hoist ropes 400 are clamped between armature plate 120 and top plate 110 and movement of hoist ropes 400 is arrested (FIG. 5). At the end of the first energized state, armature plate 120 and top plate 110 provide a gap G of sufficient size for hoist ropes 400 to move freely. Thus, in the first energized state the elevator rope braking system transitions from a braking state to a non-braking state.

In a second energized state, electromagnetic coil 170 is provided a lesser amount of power compared to that of the first energized state to create a magnetic field sufficient to hold (i.e. maintain) armature 205 within the hollow portion of magnetic core 175 against the force of springs 130. In the second energized state, armature plate 120 and top plate 110 provide gap G sufficient for hoist ropes 400 to move freely. Thus, in the second energized state, the elevator rope braking system maintains the non-braking state.

Referring to FIG. 5, an exemplary elevator rope braking system 100 is shown in the braking or non-energized state. In the braking state, electromagnetic coil 170 is not energized and springs 130 bias armature plate 120 toward top plate 110. This reduces the gap G and causes the first and second brake pads 150,155 to clamp elevator ropes 400 therebetween and arrest motion of the ropes that couple to the elevator. Thus, in the non-energized state, motion of the hoist ropes is arrested.

The elevator rope braking system may transition to the non-energized state in response, for example, to a control signal, wherein the control circuitry will no longer provide (i.e. cease to provide) power to elevator rope braking system 100, or in response to a general loss of power to the system. The transition of the elevator rope braking system to the non-energized or braking state is essentially instantaneous.

Figure 6:
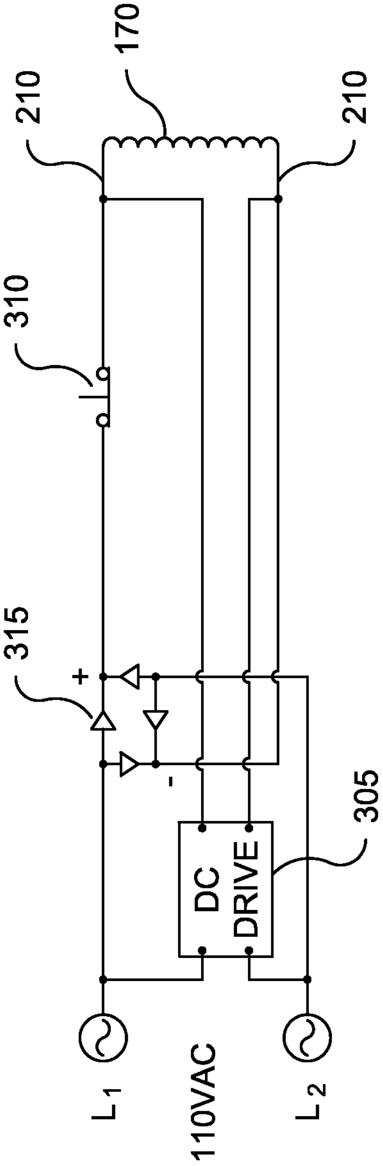
FIG. 6 is a schematic view of a circuit used with an elevator rope braking system according to an embodiment of the present invention.

Referring to FIG. 6, the elevator rope braking system 100 may include a direct current ("DC") drive 305 and a full wave rectifier bridge 315. Both DC drive 305 and full wave rectifier bridge 315 may be electrically coupled to coil leads 210 of electromagnetic coil 170. DC drive 305 is configured to provide enough power to electromagnetic coil 170 to create a magnetic force sufficient to retain armature plate 120 against the top surface 160 of outer housing 125 against the force of springs 130, thereby maintaining a sufficient gap G (FIG. 4) to permit unrestricted movement of ropes 400. DC drive 305 may be mounted directly to elevator rope braking system 100 to allow for ease of installation of the system. Alternatively, DC drive 305 may be located in a remote location, such as in an elevator control room, for ease of operation. For an elevator rope braking system configured to create a given braking force (by way of example only, a force between about 1800-5000 lb/in$^2$ and preferably about 1872 lb/in$^2$ braking force), DC drive 305 may be configured to receive 110-120 volts of alternating current ("AC") and output 15 volts DC at 1.5 amperes.

Similarly, full wave rectifier bridge 315 is configured to provide sufficient power to electromagnetic coil 170 to create magnetic force great enough to retract armature plate 120 to top surface 160 of outer housing 125 against the force of springs 130, thereby creating gap G (FIG. 4). Full wave rectifier bridge 315 may be mounted directly to the elevator rope braking system 100 or may be located in a remote location, such as in an elevator control room. For an elevator rope braking system configured to create a given braking force (by way of example only, a force between about 1800-5000 lb/in$^2$ and preferably about 1872 lb/in$^2$ braking force), full wave rectifier bridge may be configured to receive 110-120 volts AC and output 120 volts DC at 12-13 amperes. It is understood that the particular amount of braking force required may depend on various factors, including elevator car capacity, speed requirements/restrictions, response times and the like.

One or more micro limit switches 310 may be attached to the elevator rope braking system 100 at various positions to sense when the braking system 100 is in the non-braking position. Micro limit switch 310 may be positioned such that when the elevator rope braking system 100 transitions between states, micro limit switch 310 is "switched" from one state to a another state thereby controlling which elements of the circuit of FIG. 6 provide power to electromagnetic coil 170. For example, micro limit switch 310 may be attached to mounting plate 115 (as shown in FIG. 2) or to outer housing 125. Micro limit switch 310 may be operable to stop full wave rectifier bridge 315 from providing power to electromagnetic coil 170 after the elevator rope braking system 100 has reached the non-braking position.

While FIG. 6 illustrates the DC drive module 305 and full wave rectifier bridge 315 receiving a constant 110 volts AC, embodiments of the elevator rope braking system may include additional control circuitry operable to control when the 110 volts AC is provided to the circuit of FIG. 6. The control circuitry may be operable to receive a control signal indicating the state that the elevator rope braking system should be in, and optionally provide 110 volts AC across $L_1$ and $L_2$ of FIG. 6 to cause the elevator rope braking system to operate according to the control signal. By way of non-limiting example, control circuitry could include a circuit operable to allow an operator to manually control the elevator rope braking system 100. By way of alternative example, control circuitry may include a conventional processing unit, such as a computer, operable to control the elevator rope braking system according to additional parameters, such as various algorithms, sensors, or user commands. For example, control circuitry may operate to transition the elevator rope braking system 100 into the braking state if a sensor detects an over-speeding elevator car.

Figure 7:
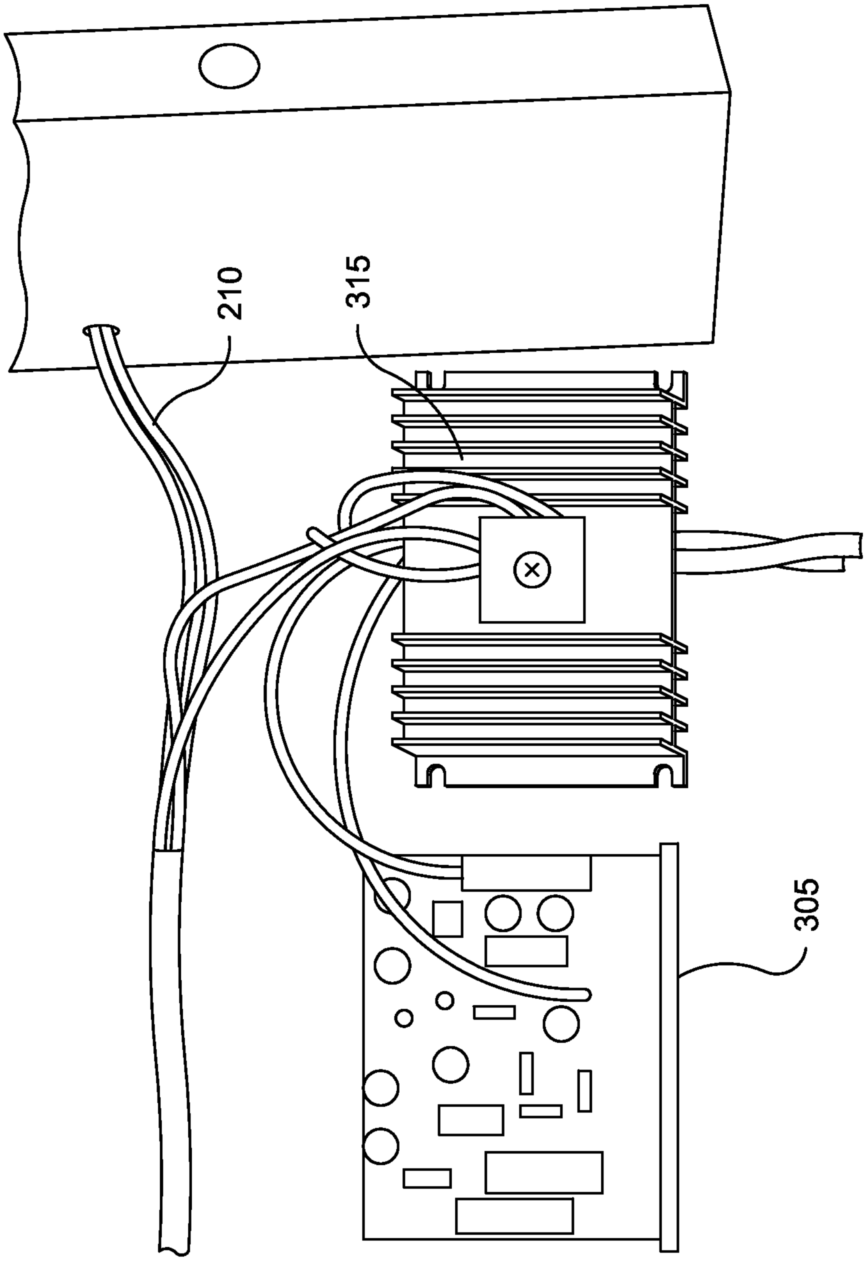
FIG. 7 is a view of a circuit useful to power the elevator rope braking system according to an embodiment of the present invention.

FIG. 7 shows a more detailed illustration of DC drive module 305 and full wave rectifier bridge 315 electrically coupled to coil leads 210. An illustration of an exemplary physical structure and position of micro limit switch 310 may be observed in FIG. 2. Of course, micro limit switch 310 may take other forms, such as, by way of non-limiting example, a conventional proximity sensor to detect when the elevator rope braking system transitions between states.

Figure 8:
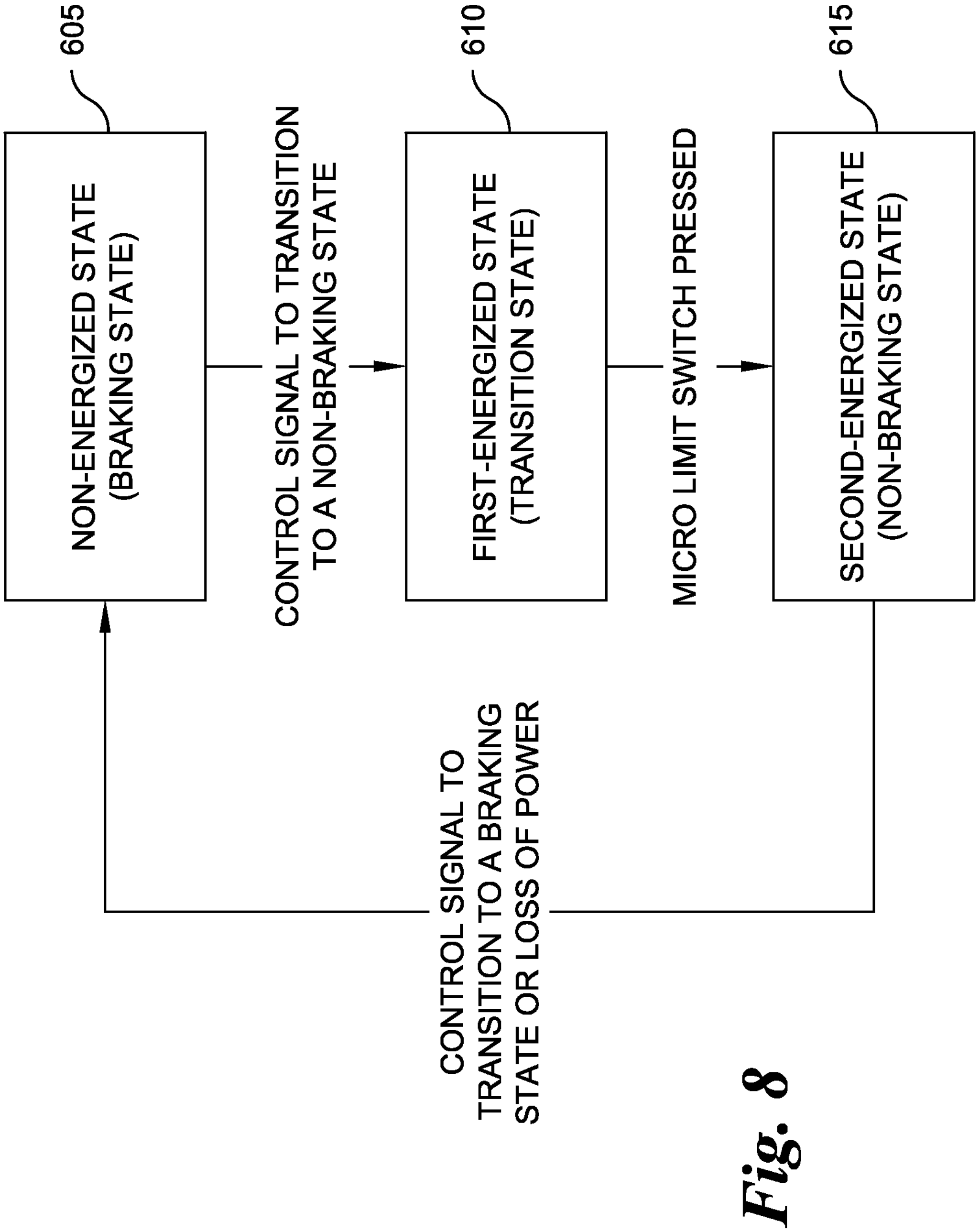
FIG. 8 is a block diagram showing the operation of an elevator rope braking system according to an embodiment of the present invention.

Referring to FIG. 8, a block diagram displays the various states of an elevator cable braking system according to an embodiment of the present invention. Elevator rope braking system 100 defaults to a non-energized or braking state 605. In this state DC drive module 305 and full wave rectifier bridge 315 provide no power to electromagnetic coil 170, thus springs 130 bias armature plate 120 and brake pad 150 toward top plate 110 and brake pad 155. The brake pads 150,155 clamp down on elevator ropes 400 as shown in FIG. 5 such that the ropes 400 are restrained from further movement.

First energized state 610 represents a transient state between non-energized state 605 and second energized state 615. First energized state 610 begins in response to the control signal communicating to the control circuitry to move the brake system from the braking state to the non-braking state. Control circuitry applies 110 volts AC to the full wave rectifier bridge 315 and the DC drive 305. It is understood that when the elevator rope braking system is in the energized state, micro limit switch 310 operates to allow voltage applied across full wave rectifier bridge 315 to provide power to electromagnetic coil 170. The first energized state lasts until armature plate 120 is retracted towards base plate 105 to such an extent that the rope can again move freely within the gap G (FIG. 4). When the elevator rope braking system 100 reaches the non-braking state, micro limit switch 310 is toggled which turns full wave rectifier bridge 315 "OFF" (i.e. full wave rectifier bridge 315 no longer provides power to electromagnetic coil 170) while leaving DC drive 305 "ON" (i.e. DC drive 305 continues to provide power to electromagnetic coil 170). First energized state 610 may last from about a fraction of a second (e.g. 0.5 sec) to about three (3) seconds, and preferably from less than about 0.5 second to less than 1 second. The short duration of the first energized state minimizes the risk of magnetizing the housing and the hoist ropes, as well as reduces the power (e.g. 98% power reduction; e.g. from 1500 watts to 20 watts) necessary to operate the elevator rope braking system. It is of course understood that the wattage requirement is affected by various factors, including the braking force required (number of pounds per square inch), car capacity, speed and the like. The short duration also reduces the heat produced during operation.

In second energized state 615 the elevator rope braking system 100 maintains the non-braking state. Specifically, in the second energized state 615, the DC drive 305 remains "ON". The voltage supplied by the DC drive 305 in the second energized state is sufficient for the elevator rope braking system 100 to remain in a non-braking state against the force exerted by the springs 130.

The elevator rope braking system 100 transitions from the second energized state 615 back to the non-energized state 605 when either: 1) a control signal operates to trigger control circuitry to discontinue providing power to the elevator rope braking system thereby causing transition to the braking state; or 2) there is a loss of power. In the event that a control signal triggers the rope braking system to transition to the braking state, control circuitry will cut power to DC drive 305 and springs 130 will bias armature plate 120 and brake pad 150 toward top plate 110 and brake pad 155, clamping the brake pads on elevator ropes 400 and arresting their movement. Similarly, if power is lost, springs 130 will bias armature plate 120 and brake pad 150 toward top plate 110 and brake pad 155, clamping the brake pads on elevator ropes 400 and arresting their movement. The elevator rope braking system may transition from the second energized state 615 to the non-energized state 605 substantially instantaneously.

While in the present embodiment the DC drive 305 provides power to the electromagnetic coil 170 in the first energized state 610, alternative embodiments may utilize only the full wave rectifier bridge 315 to provide power to the electromagnetic coil 170 in the first energized state 610. This may be accomplished, for example, by including a three-way switch adapted to activate either only full wave rectifier bridge 315 or only DC drive 305. In an alternate embodiment, both the DC drive 305 and the full wave rectifier bridge 315 provide power to the electromagnetic coil 170 in the first energized state 610 to utilize shared circuitry (as seen in FIG. 6).

While exemplary embodiments of the elevator rope braking system 100 described herein refer to control by a control signal, it is understood that the elevator rope braking system 100 may be operable without any external control circuitry/architecture. In such an embodiment, elevator rope braking system 100 would remain in non-energized state 605 until power is provided to the system. Upon receipt of power, elevator rope braking system enters first energized state 610 and will progress to second energy state 615 upon transitioning from the braking state to the non-braking state. The system will remain in the non-braking state until there is a general loss of power, at which time it will again transfer to the braking state.

While the forgoing has discussed an elevator rope braking system in relation to general passenger and freight elevators, the same principles may be implemented on a larger or smaller scale. For example, the same principles may be implemented in a rope braking system for a crane. Alternatively, for smaller elevators an elevator rope braking system could be configured that produces about 1600 lb/in$^2$ of braking force.

Additionally, the disclosed invention could be implemented in any number of alternative configurations without departing from the scope of the invention. For example, referring FIG. 9, the elevator rope braking system shows the mounting structures embodied as mounting posts 185 positioned at opposite corners of base plate 105 for rigidly attaching top plate 110 to base plate 105 as an alternative to the plate 115 or planar structures depicted in FIG. 1. Moreover, the system could be configured to accept a shaft passing through the braking system between brake pads 150,155 rather than the cable arrangement as shown. Likewise, a system may be provided in which cables or a shaft pass through the center of the system, perpendicular to a base and top plate. Additionally, the braking system could be implemented as a disk brake.

While the foregoing invention has been described with reference to the above-described embodiments, various modifications and changes can be made without departing from the spirit of the invention. Accordingly, all such modifications and changes are considered to be within the scope of the appended claims.

What is claimed is:

1. An elevator rope braking system comprising:
- a base portion and a top portion affixed by at least one mounting structure;
- a magnetic core arranged on the base portion;
- an armature plate arranged intermediate the base portion and the top portion, the armature plate having an armature on a first side thereof, the armature and armature plate movable between a first braking position and a second non-braking position;
- an electromagnetic coil arranged in proximity to the magnetic core and operative to provide an electromagnetic force sufficient to urge the armature into the second non-braking position;
- an outer housing arranged on the base portion configured to house the electromagnetic coil and magnetic core; and
- at least one spring disposed on a top surface of the outer housing between the top surface of the outer housing and the armature plate for biasing the armature and armature plate toward the first braking position.

2. The elevator rope braking system of claim 1, wherein the armature is affixed to the armature plate.

3. The elevator rope braking system of claim 2, wherein the outer housing further comprises an aperture formed therethrough configured to accommodate a set of coil leads.

4. The elevator rope braking system of claim 1, wherein the at least one spring comprises a plurality of springs distributed around the top surface of the outer housing facing the armature plate.

5. The elevator rope braking system of claim 4, wherein the outer housing comprises a ring-shaped outer housing, and wherein the plurality of springs are arranged radically around the top surface thereof.

6. The elevator rope braking system of claim 1, further comprising:
- at least one guide pin extending from the armature plate toward the outer housing; and
- at least one guide bore formed on a surface of the outer housing facing the armature plate,
- wherein the at least one guide bore is adapted to receive the at least one guide pin.

7. The elevator rope braking system of claim 1,
- wherein the armature plate is adapted to accommodate removably affixing a first brake shoe to the surface of the armature plate facing the top portion; and
- wherein the top portion is adapted to accommodate removably affixing a second brake shoe to the surface of the top portion facing the armature plate.

8. The elevator rope braking system of claim 1, wherein the at least one mounting structure comprises two mounting plates.

9. The elevator rope braking system of claim 1, further comprising a control circuit.

10. The elevator rope braking system of claim 9, wherein the control circuit is operative in a first energized state to provide sufficient power to the electromagnetic coil to generate a magnetic force capable of moving the armature from the first braking position into the second non-braking position.

11. The elevator rope braking system of claim 1, wherein the armature plate and the top portion are generally planar and arranged in parallel with respect to one another.

12. The elevator rope braking system of claim 1, wherein the armature comprises a cylindrical profile, and the magnetic core comprises a complementary cylindrical opening formed therein for accepting the armature.

13. An elevator rope braking system comprising:
- an enclosure having top and bottom fixed plates and containing:
- a housing positioned on the bottom plate and containing an electromagnetic coil;
- an armature plate in parallel with the top plate and having an armature on a first surface thereof proximal to the housing and in operative relation with the electromagnetic coil;
- one or more springs disposed on a top surface of the housing between the top surface of the housing and the armature plate for urging the armature plate in a direction toward the top plate to close a gap between the armature plate and the top plate that would be otherwise sufficient to permit one or more ropes disposed there through to pass freely, thereby defining a braking position;
- a circuit for powering the electromagnetic coil to generate a force sufficient to overcome the force provided by the one or more springs and cause movement of the armature plate toward the housing, thereby increasing the gap between the armature plate and the top plate sufficient to permit one or more ropes disposed there through to pass freely, defining a non-braking position.

14. The system of claim 13, wherein the circuit is operative in a first energized state to provide sufficient power to the coil to generate an initial magnetic force sufficient to overcome the force provided by the one or more springs and cause the armature plate to move from the braking position to the non-braking position.

15. The system of claim 14, wherein the circuit in the first energized state includes a full wave rectifier bridge that provides power to said coil; and wherein the circuit is operative to transition from the first energized state to a second energized state to provide reduced power to said coil but sufficient to maintain gap separation to permit one or more ropes disposed there through to pass freely.

16. The system of claim 15, wherein a power loss to the circuit causes the elevator rope braking system to instantaneously transition to the braking position.

17. A method of operating an elevator rope braking system comprising:
- transitioning an elevator rope braking system from a braking position to a non-braking position in response to an applied first electromagnetic force;
- sensing when the elevator rope braking system has transitioned to a non-brake position;
- in response to said sensing, maintaining the non-braking position according to an applied second electromagnetic force less than or equal to the applied first electromagnetic force; and
- detransitioning the elevator rope braking system to the braking position when the applied second electromagnetic force is not present,
- wherein the step of detransitioning the elevator rope braking system to the braking position includes biasing an armature plate into the braking position via one or more springs disposed on a top surface of a housing between the top surface of the housing and the armature plate.

18. The method of claim 17, wherein the elevator rope braking system transitions from the braking position to the non-braking position when an electromagnetic coil produces the first electromagnetic force sufficient to overcome the force produced by a plurality of springs.

19. The method of claim 18, wherein the elevator rope braking system maintains the non-braking position by providing the second electromagnetic force sufficient to maintain the non-braking position, wherein the second electromagnetic force is less than the first electromagnetic force.

* * * * *

UNITED STATES PATENT AND TRADEMARK OFFICE

CERTIFICATE OF CORRECTION

PATENT NO. : 8,485,318 B2
APPLICATION NO. : 12/767150
DATED : July 16, 2013
INVENTOR(S) : Paul J. Doran It is certified that error appears in the above-identified patent and that said Letters Patent is hereby corrected as shown below:

In the Claims:

Column 9, Line 43, Claim 5, the word "radically" should read "radially".

Signed and Sealed this
Third Day of September, 2013

Teresa Stanek Rea
*Acting Director of the United States Patent and Trademark Office*